United States Patent
Flores et al.

(10) Patent No.: US 10,458,809 B2
(45) Date of Patent: Oct. 29, 2019

(54) COGNITIVE PARKING GUIDANCE

(71) Applicant: International Business Machines Corporation, Armonk, NY (US)

(72) Inventors: Romelia H. Flores, Keller, TX (US); Hung Tack Kwan, Grand Prairie, TX (US); Donald Dejewski, North Massapequa, NY (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 15/042,133

(22) Filed: Feb. 11, 2016

(65) Prior Publication Data

US 2017/0234694 A1    Aug. 17, 2017

(51) Int. Cl.
*G01C 21/36* (2006.01)
*G08G 1/0968* (2006.01)
(Continued)

(52) U.S. Cl.
CPC ....... *G01C 21/3685* (2013.01); *G08G 1/0969* (2013.01); *G08G 1/096827* (2013.01);
(Continued)

(58) Field of Classification Search
CPC ............ G01C 21/3685; G01C 21/3453; G01C 21/3476; G01C 21/3484; G01C 21/34605;
(Continued)

(56) References Cited

U.S. PATENT DOCUMENTS 7,233,861 B2 *  6/2007  Van Buer ........... G01C 21/3617
                                              340/994
7,538,690 B1 *  5/2009  Kaplan ................. G01C 21/20
                                              340/932.2
(Continued)

FOREIGN PATENT DOCUMENTS

CN    204029163    12/2014
CN    104299444    1/2015
(Continued)

OTHER PUBLICATIONS

Associated Press, "Connected Car Technology is Getting a Big Test in New York City," www.nbcnews.com, Sep. 14, 2015.

*Primary Examiner* — Thomas G Black
*Assistant Examiner* — Sara J Lewandroski
(74) *Attorney, Agent, or Firm* — Steven M. Greenberg, Esq.; Shutts & Bowen LLP

(57) ABSTRACT

Embodiments of the present invention provide a method, system and computer program product for cognitive parking guidance. In an embodiment of the invention, a method for cognitive parking guidance includes initially receiving in memory of a computer either an express or implied definition of a navigation waypoint for a specified vehicle. The method also includes retrieving from over a computer communications network into the memory of the computer, a set of available parking spaces within a pre-specified distance of the navigation waypoint and loading into the memory of the computer a context of the vehicle. The method yet further includes filtering the available parking spaces in the set into
(Continued)

a subset of one or more available parking spaces in accordance with the context. Finally, the method includes displaying a location of a selected one of the parking spaces in the subset in a display of the computer.

18 Claims, 2 Drawing Sheets

(51) Int. Cl.
    *G08G 1/0969* (2006.01)
    *G08G 1/14* (2006.01)

(52) U.S. Cl.
    CPC ....... *G08G 1/096838* (2013.01); *G08G 1/143* (2013.01); *G08G 1/147* (2013.01); *B60R 2300/80* (2013.01); *G08G 1/141* (2013.01); *G08G 1/145* (2013.01)

(58) Field of Classification Search
    CPC ............ G01C 21/3611; G01C 21/3614; G01C 21/3617; G01C 21/362; G01C 21/3626; G01C 21/3641; G01C 21/3644; G01C 21/3679; B62D 15/027; B62D 15/0275; B62D 15/028; G06K 9/00791; G06K 9/00812; G08G 1/14; G08G 1/141; G08G 1/142; G08G 1/143; G08G 1/144; G08G 1/145; G08G 1/146; G08G 1/147; G08G 1/148; G08G 1/149; G08G 1/065; B60Q 1/48; B60Q 1/482; B60Q 1/484; B60Q 1/486; B60Q 1/488; G01S 2015/932; G01S 2015/933; G01S 2015/934; G01S 2015/935; G01S 2015/936; B60R 2300/806

See application file for complete search history.

(56) References Cited

U.S. PATENT DOCUMENTS

| | | | | |
|---|---|---|---|---|
| 8,423,275 B1 * | 4/2013 | Kandal | ................. | G08G 1/14 340/853.1 |
| 8,768,616 B2 * | 7/2014 | Kristinsson | ........ | G01C 21/3617 701/424 |
| 8,775,080 B2 * | 7/2014 | Mizuno | .............. | G01C 21/3617 701/540 |
| 8,949,028 B1 * | 2/2015 | Klampfl | ............. | G01C 21/3423 701/527 |
| 8,977,489 B2 * | 3/2015 | Szczerba | .............. | G01C 21/365 345/7 |
| 9,500,493 B2 * | 11/2016 | Gerlach | ................. | G06F 16/29 |
| 2005/0096974 A1 * | 5/2005 | Chagoly | .................. | G08G 1/14 705/13 |
| 2007/0150174 A1 * | 6/2007 | Seymour | ............ | G01C 21/3617 701/532 |
| 2011/0106426 A1 * | 5/2011 | Tertoolen | ........... | G01C 21/3476 701/533 |
| 2011/0238289 A1 * | 9/2011 | Lehmann | ........... | G01C 21/3438 701/533 |
| 2012/0265434 A1 * | 10/2012 | Woodard | ................ | G08G 1/144 701/423 |
| 2013/0030811 A1 | 1/2013 | Olleon et al. | | |
| 2013/0038437 A1 | 2/2013 | Talati et al. | | |
| 2014/0249742 A1 * | 9/2014 | Krivacic | ................. | G06Q 10/02 701/400 |
| 2015/0123818 A1 * | 5/2015 | Sellschopp | ........ | G01C 21/3484 340/932.2 |
| 2016/0025503 A1 * | 1/2016 | Kees | ...................... | G08G 1/144 701/400 |
| 2016/0061618 A1 * | 3/2016 | Benenson | .......... | G01C 21/3453 701/428 |
| 2016/0111003 A1 * | 4/2016 | Miura | .................... | G08G 1/146 340/932.2 |
| 2016/0196747 A1 * | 7/2016 | Tsyrklevich | ........... | G08G 1/143 701/532 |
| 2016/0223345 A1 * | 8/2016 | Thakur | .................. | G01C 21/34 |
| 2017/0132928 A1 * | 5/2017 | Hong | ..................... | H04L 67/18 |
| 2017/0144654 A1 * | 5/2017 | Sham | .................... | B60W 30/06 |
| 2017/0148324 A1 * | 5/2017 | High | ...................... | G08G 1/144 |
| 2017/0154530 A1 * | 6/2017 | Irion | ................ | G01C 21/3685 |
| 2017/0178511 A1 * | 6/2017 | Berns | .................. | G08G 1/142 |
| 2017/0191849 A1 * | 7/2017 | Agam | ............... | G01C 21/3685 |
| 2017/0206786 A1 * | 7/2017 | Dhondse | ................ | G08G 1/143 |
| 2017/0219361 A1 * | 8/2017 | Mays | ................... | G08G 1/0112 |
| 2017/0232961 A1 * | 8/2017 | Gusikhin | ............ | B60W 30/06 701/23 |
| 2017/0236418 A1 * | 8/2017 | Bostick | .................. | G08G 1/143 340/932.2 |

FOREIGN PATENT DOCUMENTS

| | | | | |
|---|---|---|---|---|
| CN | 104464368 | | 3/2015 | |
| DE | 102010019465 A1 * | | 11/2011 | ............. G08G 1/127 |
| EP | 1705094 | | 9/2006 | |

\* cited by examiner

COGNITIVE PARKING GUIDANCE

BACKGROUND OF THE INVENTION

Field of the Invention

The present invention relates to telematics and intelligent vehicle technologies and more particularly to intelligent parking management for motor vehicles.

Description of the Related Art

Telematics is an interdisciplinary field of study that encompasses telecommunications, vehicular technologies, road transportation, road safety, electrical engineering inclusive of sensors, instrumentation, and wireless communications, and computer science. An intelligent vehicle technology refers to a telematic arrangement of one or more electronic, electro-mechanical and electromagnetic devices, including different sensors disposed externally from and internally to a vehicle, operating in concert along with a radio transceiver to provide vehicle command and control and information services. Modern intelligent vehicle technology products primarily focus upon vehicular safety and hazard warning as well as traffic and navigation.

Parking assistance systems relate to intelligent vehicle technologies in so far as parking assistance systems facilitate the location of an available parking space and, through the use of telematics, facilitate the placement of a vehicle into a parking space. Indeed, for several years, advanced parking assistance systems have been able to provide for the automated parking of a vehicle without human intervention. Yet, most commercially successful parking assistance systems address the need to manage a parking lot or parking garage by locating available parking spaces and publishing a count of available spaces for viewing by a motorist.

In this regard, a general implementation of a parking assistance system utilizes digital camera technology and content based image retrieval technologies so as to identify one or more different available parking spaces in a parking lot. Different light emitting diode (LED) lighting systems are coupled to a controller receiving and reducing acquired imagery so as to guide a motorist to an available parking space. However, as it will be understood, conventional parking assistance systems are vehicle agnostic and driver agnostic. Instead, conventional parking assistance systems are simply one-dimensional in respect to the binary determination of whether or not a parking space is occupied.

But, not all parking spaces are suitable for all vehicles. Further, not all parking spaces are suitable for all motorists. Different parking spaces are best occupied by vehicles of a particular size or weight. Likewise, different motorists have different capabilities in parking a vehicle in a particular parking space. Most importantly, different motorists have different needs in respect to a location of a parking space relative to one or more different, extrinsic criteria such as the weather and the location of one or more waypoints of travel of each motorist. Yet, modern parking assistance systems do not provide a way to account for such needs of the individual motorist and the individual vehicle.

BRIEF SUMMARY OF THE INVENTION

Embodiments of the present invention address deficiencies of the art in respect to parking assistance and provide a novel and non-obvious method, system and computer program product for cognitive parking guidance. In an embodiment of the invention, a method for cognitive parking guidance includes initially receiving, either expressly or by implication, in memory of a computer a definition of a navigation waypoint for a specified vehicle. The method also includes retrieving from over a computer communications network into the memory of the computer, a set of available parking spaces within a pre-specified distance of the navigation waypoint and loading into the memory of the computer a context of the vehicle. The method yet further includes filtering the available parking spaces in the set into a subset of one or more available parking spaces in accordance with the context. Finally, the method includes displaying a location of a selected one of the parking spaces in the subset in a display of the computer.

In one aspect of the embodiment, the definition of the waypoint is determined expressly through a user interface to a navigation system. However, in the alternative, the definition of the waypoint is determined implicitly based upon a time and day when the waypoint is determined in correspondence to a past destination at a similar time and day. In another aspect of the embodiment, the context includes either a vehicle type, a vehicle model or a vehicle dimension. In yet another aspect of the embodiment, the context includes either a weather report associated with the navigation waypoint or a time of day. In even yet another aspect of the embodiment, the filtering is additionally based upon a pre-stored preference of a motorist providing the navigation waypoint, for instance a past selection of a parking space proximate to the navigation waypoint. Finally, the filtering may additionally be based upon a location of a public event relative to the navigation waypoint.

In another embodiment of the invention, an intelligent vehicle data processing system is configured for cognitive parking guidance. The system includes a host computing device including memory and at least one processor. The system also includes a navigation system executing in the memory of the host computing device. Finally, the system includes a cognitive parking guidance module coupled to the navigation system, the module comprising program code enabled upon execution in the memory of the device to receive from the navigation system an implicit or express definition of a navigation waypoint for a specified vehicle, to retrieve from over a computer communications network into the memory of the device a set of available parking spaces within a pre-specified distance of the navigation waypoint, to load into the memory of the computer a context of the vehicle, to filter the available parking spaces in the set into a subset of one or more available parking spaces in accordance with the context, and to display in the device a location of a selected one of the parking spaces in the subset in a display of the computer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for cognitive parking guidance. In accordance with an embodiment of the invention, a navigation waypoint is defined for a vehicle based upon either an explicit request in a parking guidance system or based upon an inferred destination of the vehicle based upon past knowledge of the travel patterns associated either with the vehicle or a motorist operating the vehicle. Thereafter, a set of available parking spaces within a pre-specified distance of the navigation waypoint are determined. A context of the vehicle, such as a vehicle model or vehicle type, or an identity of a motorist operating the vehicle is determined. Optionally, one or more vehicle or motorist preferences are retrieved from memory. Thereafter, the parking spaces in the set are filtered or sorted into a subset of one or more available parking spaces in accordance with the preferences and the context. Finally, a selection of a parking space in the subset is received and navigation instructions to the selected parking space presented in a user interface to the parking guidance system.

Figure 1:
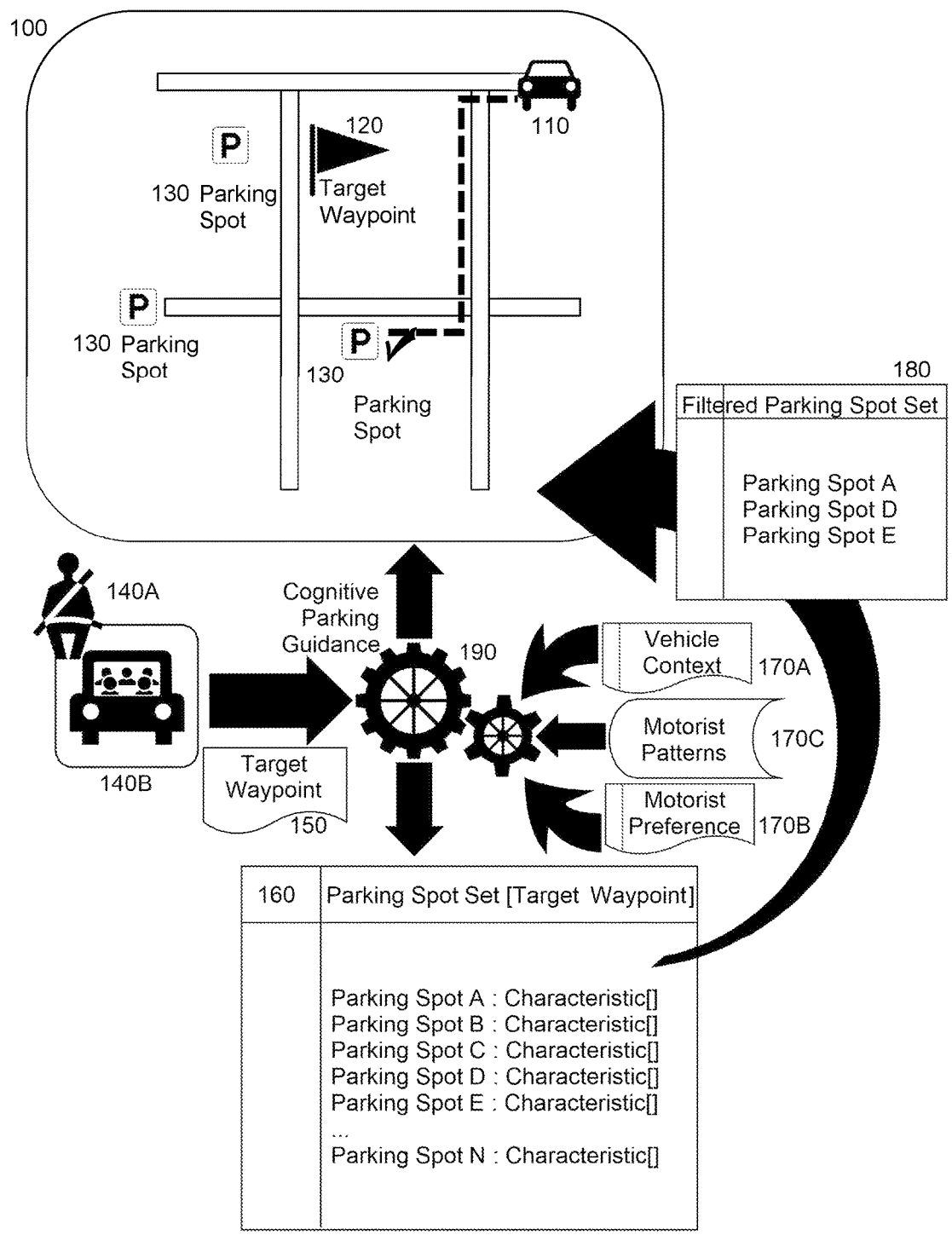
FIG. 1 is a pictorial illustration of a process for cognitive parking guidance.

In further illustration, FIG. 1 pictorial shows a process for cognitive parking guidance. As shown in FIG. 1, a waypoint 120 for vehicle 140B is determined based upon either an inferred destination of travel determined for the motorist 140A from motorist patterns 170C specifying one or more prior destinations of the motorist 140A at corresponding particular times of the day, or the waypoint 120 is determined based upon an express request 150 submitted by a corresponding motorist 140A in connection with a target waypoint 120, for instance in the form of geographic coordinates, to cognitive parking guidance logic 190. In either circumstance, cognitive parking guidance logic 190 locates a set of known parking spaces 160 geographically proximate within a threshold distance from the target waypoint 190. Thereafter, cognitive parking guidance logic 190 filters the set of known parking spaces 160 to a subset 180 based either upon a vehicle context 170A of the vehicle 140B, or a motorist preference 170B of the end user motorist 140A, or both.

In this regard, the vehicle context 170A may be a physical characteristic of the vehicle 140B operated by the end user motorist 140A, the weather or time of day experienced by the vehicle 140B at the target waypoint 120, or anticipated traffic published in connection with the target waypoint 120, or even a subsequent waypoint to which the end user motorist 140A is to navigate subsequent to the target waypoint 120. Likewise, the motorist preference 170B may be a known preference of the end user motorist 140A of a type of parking space, such as parallel or compact, covered, well lit by street lighting, valet, and the like. Finally, based upon the filtered subset 180, a user interface 100 for a navigation system can be modified to display the parking spaces 130 in the filtered subset 180 as well as the target waypoint 120. Optionally, navigation instructions can then be submitted to the navigation system for a selected one of the parking spaces 130 in the filtered subset 180.

Figure 2:
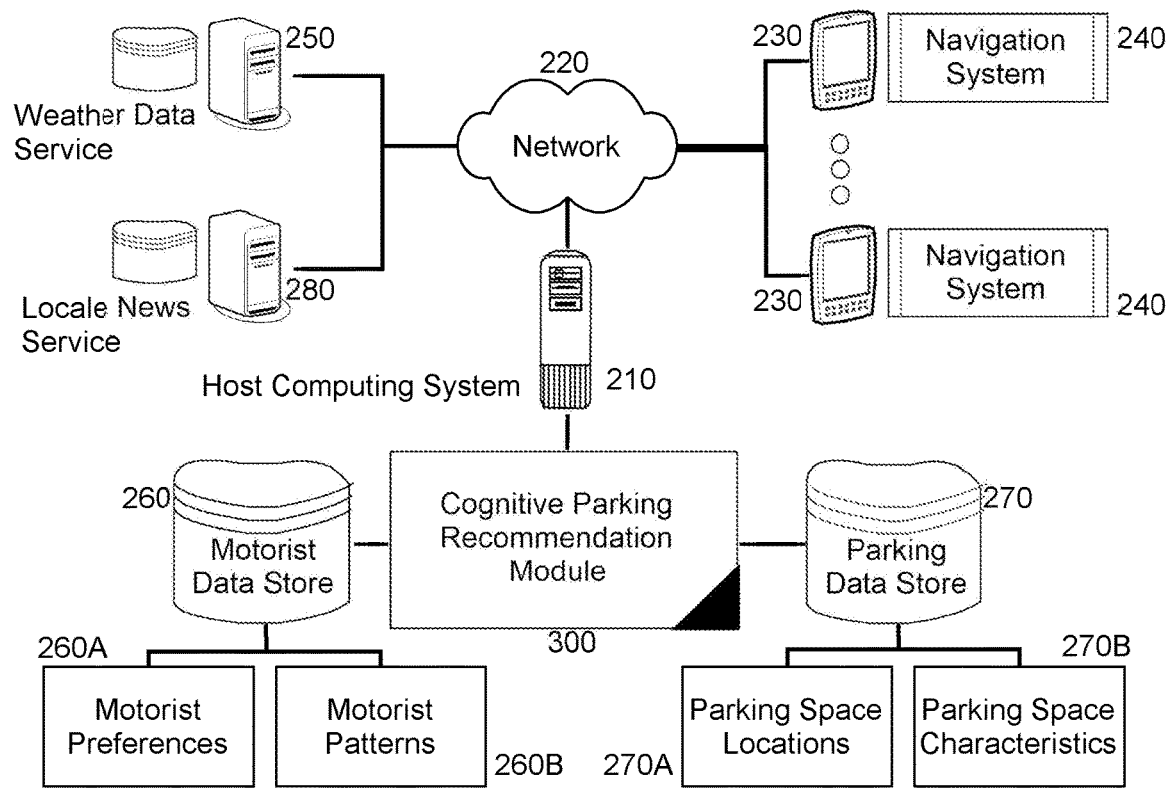
FIG. 2 is a schematic illustration of an intelligent vehicle data processing system configured for cognitive parking guidance; and, FIG. 3 is a flow chart illustrating a process for cognitive parking guidance.

The process described in connection with FIG. 1 may be implemented in connection with an intelligent vehicle data processing system providing a cognitive parking recommendation service for different navigation clients over a network. In yet further illustration, FIG. 2 schematically shows an intelligent vehicle data processing system configured for cognitive parking guidance. The system includes a host computing system 210 that may include one or more computers, each with memory and at least one processor (only a single computer shown for ease of illustration). The host computing system 210 is communicatively coupled over computer communications network 220 to a multiplicity of different remotely disposed computing devices 230, each providing an operating environment for a corresponding navigation client 240.

A cognitive parking recommendation module 300 includes program code that executes in the memory of the host computing system 210 and is coupled to each of a motorist data store 260 and a parking data store 270. The motorist data store 260 includes both motorist preferences 260A of different motorists as well as observed past parking patterns 260B of different motorists. For example, with respect to the latter, a frequency of utilization of different parking spaces are recorded in connection with different motorists so as to permit the computation of a most preferred parking space amongst a set of parking spaces for a specified motorist in the motorist data store 260. The parking data store 270 in turn includes both parking spaces 270A corresponding to different geographic locations, and parking space characteristics 270B of different parking spaces.

Upon execution, program code of the cognitive parking recommendation module 300 receives different parking requests from different ones of the navigation clients 240 in connection with different waypoints. Each parking request may be explicit in a specified waypoint, or implicit based upon past known motorist patterns 260B, such as a past destination of the motorist at a similar time of day or day of week. In response to a parking request for a particular waypoint from a particular one of the navigation clients 240 in connection with a particular motorist, the program code retrieves from the parking space locations 270A in the parking data store 270 a set of parking spaces known to be proximate to the particular waypoint. The program code further identifies a context of a vehicle associated with the parking request, such as a type of vehicle or a particular dimension of the vehicle and the program code retrieves from the parking space characteristics 270B of the parking data store 270 parking space characteristics for each parking space in the set of parking spaces. The program code yet further identifies in the motorist preferences 260A of the motorist data store 260 one or more known parking preferences for the particular motorist as well as a preference derived from the motorist patterns 260B of the motorist data store 260 of a past parking pattern of the particular motorist.

The program code optionally retrieves weather information from a remotely disposed weather data service 250 so as to indicate expected weather at the particular waypoint, and the program code optionally retrieves from a locale news service 280 information pertinent to an anticipated traffic condition at the particular waypoint such as a reference to a social gathering, road closure, sporting event or construction event proximate to the particular waypoint. As well, the local news service 280 can provide information pertinent to criminal activity occurring in proximity to different parking spaces. Finally, the program code filters the set of parking spaces consistent with the context of the vehicle and the characteristics of the parking spaces in the set, retrieved parking preferences for the particular motorist. The program code additionally filters the set of parking spaces consistent with the retrieved preferences of the particular motorist as well as the past parking preferences determined from the motorist patterns of the particular motorist. Even yet further, the program code filters the set of parking spaces consistent with the expected weather at the particular waypoint and consistent with expected traffic and parking conditions at the particular waypoint. Finally, the program code presents the filtered set of parking spaces in a user interface to the particular navigation client so as to permit the particular motorist to select one of the parking spaces in the filtered set.

Figure 3:
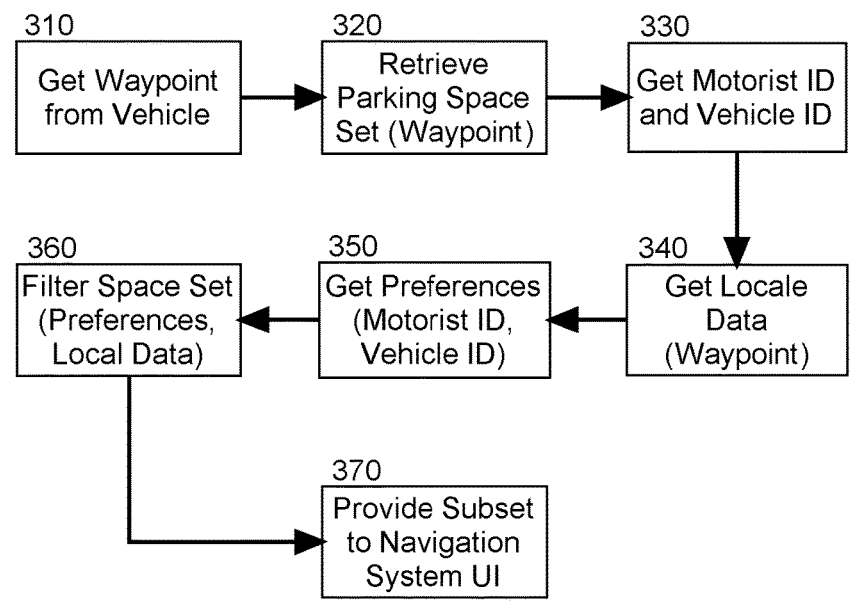

In yet further illustration of the operation of the cognitive parking recommendation module 300, FIG. 3 is a flow chart illustrating a process for cognitive parking guidance. Beginning in block 310, a waypoint is received in connection with a particular motorist, either by way of an expressly specified destination within a user interface to a navigation system or by way of an inferentially determined destination based upon previous destinations of the motorist determined from the previous driving patterns of the particular motorist. In block 320, a set of parking spaces geographically proximate to the waypoint are retrieved and in block 330 an identity of the motorist as well as a corresponding vehicle are identified. In block 340, locale data for the waypoint are retrieved from over a computer communications network, such as anticipated daylight at the waypoint, anticipated weather conditions at the waypoint and anticipated traffic and parking conditions at the waypoint.

Yet further, in block 350, individual parking preferences are determined based upon the identity of the motorist and the vehicle. Finally, in block 360, the set of parking spaces are filtered to a subset in accordance with the anticipated weather at the waypoint, the anticipated traffic and parking conditions at the waypoint, the individual parking preferences of the motorist and the characteristics of the vehicle. Then, in block 370 the subset is provided to a user interface of the navigation system. Optionally, supplementary information regarding parking conditions at the waypoint are presented in the user interface of the navigation system, such as the expected weather conditions, daylight conditions at an expected time of arrival at the waypoint so as to necessitate a well lit parking space, expected traffic conditions at the waypoint as well as expected parking availability due to any known events or conditions at the waypoint.

Thus, the inventive method, system and apparatus provides the motorist the option of selecting a parking space from a filtered set of parking spaces proximate to a specified waypoint in advance of arrival at the specified waypoint based upon the ability of a corresponding vehicle to fit a selected one of the parking spaces in the filtered subset, personal preferences of the motorist in regard to a type of parking space (e.g. parallel or otherwise) or past demonstrable patterns of parking indicative of a preference, an expected weather at the waypoint, the location of parking space (e.g. covered, well-illuminated, pay lot, metered, or garaged), the proximity of the parking space relative to a subsequent waypoint, or the proximity to a location associated with an anticipated traffic condition.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detailed and by reference to embodiments thereof, it will be apparent that modifications and variations are possible without departing from the scope of the invention defined in the appended claims as follows:

1. A method for cognitive parking guidance comprising:
    receiving in memory of a computer, a set of navigation waypoints defining a route for a specified vehicle of a motorist;
    retrieving from over a computer communications network into the memory of the computer, a set of available parking spaces within a pre-specified distance of a selected one of the navigation waypoints;
    loading into the memory of the computer a context of the vehicle that includes a physical characteristic of the vehicle;
    filtering the available parking spaces in the set into a subset of one or more available parking spaces in accordance with the context and also in consideration of a subsequent one of the navigation waypoints following the selected one of the navigation waypoints; and,
    displaying a location of a selected one of the parking spaces in the subset in a display of the computer.

2. The method of claim 1, wherein the context includes one of a vehicle type, a vehicle model and a vehicle dimension.

3. The method of claim 1, wherein the the filtering is additionally based upon an environmental factor includes a factor selected from the group consisting of a weather report, and a time of day.

4. The method of claim 1, wherein the filtering is additionally based upon a pre-stored preference of a motorist providing the navigation waypoint.

5. The method of claim 4, wherein the pre-stored preference is a past selection of a parking space proximate to the navigation waypoint.

6. The method of claim 1, wherein the filtering is additionally based upon a location of a public event relative to the navigation waypoint.

7. An intelligent vehicle data processing system configured for cognitive parking guidance, the system comprising:
    a host computing device comprising memory and at least one processor;
    a navigation system executing in the memory of the host computing device; and,
    a cognitive parking guidance module coupled to the navigation system, the module comprising program code enabled upon execution in the memory of the device to receive in the memory of the device from the navigation system, a set of navigation waypoints defining a route for a specified vehicle of a motorist, to retrieve from over a computer communications network into the memory of the device a set of available parking spaces within a pre-specified distance of a selected one of the navigation waypoints, to load into the memory of the computer a context of the vehicle that includes a physical characteristic of the vehicle, to filter the available parking spaces in the set into a subset of one or more available parking spaces in accordance with the context and also in consideration of a subsequent one of the navigation waypoints following the selected one of the navigation waypoints, and to display in the device a location of a selected one of the parking spaces in the subset in a display of the computer.

8. The system of claim 7, wherein the filtering is additionally based upon a location of a public event relative to the navigation waypoint.

9. The system of claim 7, wherein the context includes one of a vehicle type, a vehicle model and a vehicle dimension.

10. The system of claim 7, wherein the context includes a factor selected from the group consisting of a weather report, and a time of day.

11. The system of claim 7, wherein the filtering is additionally based upon a pre-stored preference of a motorist providing the navigation waypoint.

12. The system of claim 11, wherein the pre-stored preference is a past selection of a parking space proximate to the navigation waypoint.

13. A computer program product for cognitive parking guidance, the computer program product comprising a non-transitory computer readable storage medium having program instructions embodied therewith, the program instructions executable by a device to cause the device to perform a method comprising:
   receiving in memory of a computer, a set of navigation waypoints defining a route for a specified vehicle of a motorist;
   retrieving from over a computer communications network into the memory of the computer, a set of available parking spaces within a pre-specified distance of a selected one of the navigation waypoints;
   loading into the memory of the computer a context of the vehicle that includes a physical characteristic of the vehicle;
   filtering the available parking spaces in the set into a subset of one or more available parking spaces in accordance with the context and also in consideration of a subsequent one of the navigation waypoints following the selected one of the navigation waypoints; and,
   displaying a location of a selected one of the parking spaces in the subset in a display of the computer.

14. The computer program product of claim 13, wherein the filtering is additionally based upon a pre-stored preference of a motorist providing the navigation waypoint.

15. The computer program product of claim 14, wherein the pre-stored preference is a past selection of a parking space proximate to the navigation waypoint.

16. The computer program product of claim 13, wherein the context includes one of a vehicle type, a vehicle model and a vehicle dimension.

17. The computer program product of claim 13, wherein the context includes a factor selected from the group consisting of a weather report, and a time of day.

18. The computer program product of claim 13, wherein the filtering is additionally based upon a location of a public event relative to the navigation waypoint.

* * * * *